United States Patent [19]

Van Dalen et al.

[11] Patent Number: 5,069,829

[45] Date of Patent: Dec. 3, 1991

[54] PROCESS FOR REFINING GLYCERIDE OIL USING SILICA HYDROGEL

[75] Inventors: Josef P. Van Dalen, Maartensdijk; Leo Brunia, Rotterdam, both of Netherlands

[73] Assignee: Van den Bergh Foods Co., Division of Conopco, Inc., Lisle, Ill.

[21] Appl. No.: 495,257

[22] Filed: Mar. 16, 1990

[30] Foreign Application Priority Data

Mar. 21, 1989 [GB] United Kingdom ................ 8906443

[51] Int. Cl.[5] ............................ C09F 5/10; C11B 3/00

[52] U.S. Cl. .............................................. 260/428

[58] Field of Search .......................................... 260/428

[56] References Cited

U.S. PATENT DOCUMENTS

| | | | |
|---|---|---|---|
| 4,049,686 | 9/1977 | Ringers et al. | 260/428 |
| 4,629,588 | 12/1986 | Welsh et al. | 260/428 |
| 4,880,574 | 11/1989 | Welsh | 260/428 |

FOREIGN PATENT DOCUMENTS

| | | | |
|---|---|---|---|
| 0185182 | 6/1986 | European Pat. Off. | 260/428 |
| 0269173 | 6/1988 | European Pat. Off. | 260/428 |
| 1349409 | 4/1974 | United Kingdom | 260/428 |
| 2168373 | 6/1986 | United Kingdom | 260/428 |

OTHER PUBLICATIONS

Modified Bleaching; J. Bogdanor of W. R. Grace & Co., Connecticut Presented at 80th Annual Meeting of the American Oil Chemists' Society Cincinnati, Ohio, May 3-6, 1989.

*Primary Examiner*—Jose G. Dees
*Attorney, Agent, or Firm*—Rimma Mitelman

[57] ABSTRACT

The invention relates to a process for refining glyceride oil comprising the steps of:

i) contacting the glyceride oil with a silica hydrogel;
ii) removing water from the mixture of glyceride oil and silica hydrogel; and
iii) separating the silica hydrogel from the mixture.

Preferably water is removed to such an extent that the final water content of the mixture of glyceride oil and silica hydrogel is less than 0.2% wt., preferably 0.1% wt., or even less than 0.1% wt.

11 Claims, No Drawings

PROCESS FOR REFINING GLYCERIDE OIL USING SILICA HYDROGEL

The present invention relates to a process for refining glyceride oil, and notably to a refining process using silica hydrogel.

Glyceride oils from vegetable or animal origin, such as soyabean oil, rapeseed oil, sunflower oil, cotton seed oil and the like, are valuable raw materials for the food industry, but it is understood that refined oils of which the end use is non-edible, are also included. These oils in good form are usually obtained from seeds and beans by pressing and/or solvent extraction.

Such crude glyceride oil mainly consists of glyceride components. However, they generally contain also a significant amount of non-triglyceride components, including phosphatides (gums), waxy substances, partial glycerides, free fatty acids, coloring materials, oxidized compounds and small amounts of metals which are thought to be associated with the phosphatides. Depending on the intended use of the oil, many of these impurities have an undesired effect on the quality, such as taste (stability) and color of the latter products. It is therefore necessary to refine the crude glyceride oil, i.e. to remove the phosphatides and the other impurities.

In general the first step in the refining process for glyceride oils is the so-called degumming step, i.e. the removal of among other things the phosphatides. In a conventional degumming process water is added to the crude glyceride oil in order to hydrate the phosphatides, which are subsequently removed e.g. by centrifugal separation. Since the resulting water degummed glyceride oil often still contains unacceptably high levels of "non-hydratable" phosphatides, this water degumming step is normally followed by chemical treatments with acid an/or alkali to remove this residual phosphatides and to neutralize the free fatty acids (alkali-refining). Subsequently the soapstock formed is separated from the neutralized oil by e.g. centrifugal separation. The regulating oil is then further refined using bleaching and deodorization treatments.

U.S. Pat. No. 4,049,686 disclosed a refining process in which the crude or water degummed glyceride oil is treated with a concentrated acid such as citric acid, phosphoric acid or acetic anhydride, and finally with water, whereby residual phosphorus levels are brought down to within the range of from 20–50 ppm.

The lower the amount of residual phosphatides after the degumming step, the better or easier the subsequent refining steps. Even it may be possible to avoid the alkali refining step all together. A refining process sequence which does not involve an alkali treatment and subsequent removal of soapstock is often referred to as physical refining and is highly desirable in terms of processing simplicity and yield.

The removal of phosphatides from glyceride oils using physical process steps in addition to conventional chemical processes is disclosed in the prior art.

U.S. Pat. No. 4,629,588 discloses the use of amorphous silicas, such as hydrogels, for the removal of phosphatides and associated trace contaminants from glyceride oil. Hydrogel as amorphous silica absorbent is preferably used because this exhibits superior filterability as compared to other forms of silica, such as silicagels, precipitated silicas, dialytic silicas ans fumed silicas. An important effect on the filterability is the water content of the silica hydrogel, which water content preferably is greater than 30% wt. This relatively high water content is necessary, because on drying the silica hydrogel its texture is changed such that at least the filterability is decreased.

Now, it has been found that if, after the addition of silica hydrogel to glyceride oil pretreated with acid and water, water is removed from this mixture, phosphatides are more effectively and to a larger extent removed in comparison to refining under "wet" conditions.

Accordingly, the process of the invention for refining glyceride oils, comprising the steps of:

i) contacting the glyceride oil with a silica hydrogel;

ii) removing water from the mixture of glyceride oil and silica hydrogel; and iii) separating the silica hydrogel from the mixture.

Although not mandatory, it is preferred to remove from the glyceride oil hydratable phosphatides and use as a starting material water degummed glyceride oil, that is most preferred pretreated with an acid and/or water.

Because the silica hydrogel possesses a relatively fragile structure, it is preferred that the silica hydrogel has an initial water content of 30%–70% wt based on the silica hydrogel weight. Alternatively, it was found that predrying the silica hydrogel under mild conditions (e.g. 105° C. for several hours) even to complete dryness does not result in an inferior phosphorus removal, but to an acceptable phosphorus removal and surprisingly to a relatively large phosphorus removal upon addition of the silica hydrogel.

An optimal or even maximal phosphatide removal is obtained if the final water content of the mixture of glyceride oil and silica hydrogel is less than 0.2% wt, preferably 0.1% wt, most preferred is a final water content of the mixture of glyceride oil and silica hydrogel of less than 0.1% wt.

The amount of silica hydrogel to be added to the glyceride oil, depends on the type of glyceride oil and further on its phosphatide content. Generally the amount of silica hydrogel added lies within the range of about 0.2%–5% wt, practically between 0.5%–2% wt based on the glyceride oil weight.

The silica hydrogels used in the refining process according to the invention are commercially available (Davison Chemical Division of W. R. Grace & Co.), such as Trisyl and Trisyl 300, having a water content of 60%–70% wt. The producer recommends the use of silica hydrogels having a water content not lower than 30% wt.

The removal of water from the mixture of glyceride oil and silica hydrogel may be performed using any conventional method, such as drying under reduced pressure (e.g., 50–200 mbar) or introducing an inert gas.

After adding the silica hydrogel to the glyceride oil and the removal of water to a predetermined final water content, the mixture is allowed to stand for a resident time of 5–60 min under practical conditions 15–45 min, preferably 30 min.

The silica hydrogel loaded with phosphatides and other impurities, may be separated from the refined glyceride oil by any conventional method, such as centrifugation, filtration, decantation or even settling.

The temperature of the glyceride oil during the refining process is not critical and should be such that the glyceride oil has a sufficiently low viscosity and can be effectively dried. The temperature range is from about 25° C.–100° C., preferably 75° C.–95° C.

After refining with silica hydrogel according to the invention the refined oil may be further refined using a bleaching earth. An intermediate silica hydrogel removal step may be avoided if, according to a preferred embodiment of the process according to the invention, the glyceride oil is refined with bleaching earth with the silica hydrogel still present. If no separation step is applied, the bleaching earth is added after the mixture has been dried sufficiently.

Hereafter several embodiments of the refining process of the invention will be given for illustrative purposes and not construed for limiting the invention thereto.

EXAMPLE 1

A soyabean oil conventionally water degummed and containing phosphor substances corresponding to 160 mg/kg P, is refined at a temperature of 90° C. 0.15% citric acid solution (50% wt) is added and after a residence time of 15 min 0.25% wt water is added. After 15 min 1.0% wt Trisyl (Davison Chemical Division of W. R. Grace & Co.) is added and after a residence time of 30 min water is removed from the mixture by drying at a subatmosphere pressure until the water content of the mixture is less than 0.1% wt. After a residence time of 30 min (water content 0.08% wt) the hydrogel is removed from the glyceride oil by filtration. The phosphorus content of the refined oil is 43 mg/kg.

EXAMPLE 2 (not according to the invention)

Example 1 is repeated, however the water removing step is omitted and after a contacting time of 30 min Trisyl is removed. The refined glyceride oil contained 92 mg/kg phosphorus.

EXAMPLE 3

Example 1 is repeated using a water degummed soyabean oil containing 163 mg/kg phosphorus.

The final phosphorus content of the refined glyceride oil is 35 mg/kg.

EXAMPLE 4

Example 3 is repeated, but instead of Trisyl, Trisyl 300 (obtained from Davison Chemical Division of W. R. Grace & Co.) was used. The final concentration of phosphorus in the refined glyceride oil was 40 mg/kg.

EXAMPLE 5

Example 1 is repeated using a water degummed soyabean oil containing 168 mg/kg phosphorus (water content 0.25% wt).

The effect of the water content of the silica hydrogel on the removal of phosphorus substances was investigated using silica hydrogel dried under mild conditions (100° C.-105° C. to a specific water content).

In each experiment the amounts of silica hydrogel used were normalized and based on the dry content of 0.39% wt dry materials.

The experimental results are summarized in table 1.

TABLE 1

| amount hydrogel (% wt) | water content hydrogel used (% wt) | phosphorus content of the glyceride oil after filtration (mg/kg) after addition hydrogel | after insitu drying |
|---|---|---|---|
| 1.0 | 61 | 92 | 34 |
| 0.50 | 22 | 66 | 44 |
| 0.39 | 0 | 67 | 51 |

EXAMPLE 6

A soyabean oil conventionally water-degummed and containing phosphor substances corresponding to 168 mg/kg P and a water content of 0.25% wt is refined at a temperature of 90° C. by a direct addition of 1.0% wt Trisyl 300 (Davison Chemical Division of W. R. Grace and Co.). The water content of this mixture is 0.88% wt. Refraining from insitu drying of this mixture according to the invention provides after filtration a refined oil containing 93 mg/kg P. Subjecting the original mixture to the insitu drying treatment according to the invention to a water content of 0.08% wt and the removal of the hydrogel after a residence time of 30 min at 90° C., the phosphorus content of the refined oil is 56 mg/kg.

EXAMPLE 7

A rapeseed oil conventionally water-degummed (abbreviated wdgRP) and containing phosphorus substances corresponding to 82 mg/kg P and a water content of 0.08% wt is refined at a temperature of 90° C. 0.10% wt citric acid solution (50% wt) is added and after a residence time of 15 min 0.25% wt water is added. After another 15 min residence time 0.75% wt Trisyl (Davision Chemical Division of W. R. Grace & Co.) is added and after a residence time of 30 min water is removed from the mixture by drying at subatmospheric pressure until the water content is less than 0.1% wt. In order to verify whether the silica hydrogel has absorbed all the phosphatides, a small sample is collected and filtered. The filtered sample has a phosphorus content below 1 mg/kg P.

Subsequently, 1.2% wt Tonsil Optimum FF (bleaching earth, obtained from Sudchemie) is added and the oil is bleached at subatmospheric pressure for 20 min. After cooling the mixture to a temperature of 70° C., the solids are filtered off and the filtered oil is deodorized at a temperature of 240° C. For comparison, an experiment is carried out with the same lot of water-degummed rapeseed oil applying normal alkaline refining. In table 2 the analytical data of water-degummed rapeseed oil, and of the same oil after silica hydrogel refining according to the invention (route 1) and after conventional alkaline refining (route 2) are shown. The fresh taste of the silica hydrogel refined oil and of the alkaline refined oil are good. After 6 weeks of storage at ambient temperature the taste is still acceptable for both oil samples.

TABLE 2

| | P (mg/kg) | Fe (mg/kg) | POV[1] ($meqO_2$/kg) | E232[2] (1%/1 cm) | E268[2] (1%/1 cm) | Colour-Lovibond (Y + R + B) |
|---|---|---|---|---|---|---|
| wdg RP | 82 | 1.0 | 1.5 | 1.5 | 0.15 | 50 + 5.0 + 0.3 |

TABLE 2-continued

| | P (mg/kg) | Fe (mg/kg) | POV[1] (meq$O_2$/kg) | E232[2] (1%/1 cm) | E268[2] (1%/1 cm) | Colour-Lovibond (Y + R + B) |
|---|---|---|---|---|---|---|
| route 1: | | | | | | |
| filtered | <1 | 0.01 | 1.5 | 4.0 | 0.71 | 3 + 0.3 |
| deodorized | <1 | 0.01 | 0.3 | 3.9 | 0.65 | 2 + 0.2 |
| route 2: | | | | | | |
| filtered | <1 | <0.01 | — | — | — | 4 + 0.4 |
| deodorized | <1 | <0.01 | 0.2 | 4.3 | 1.00 | 1 + 0.1 |

[1]POV = the peroxide value
[2]E232, E268 = the extinction at 232 nm and 268 nm, respectively, in a measuring cell having a cell length of 1 cm These examples according to the invention show that by drying the mixture of glyceride oil and silica hydrogel, a relatively large additional amount of phosphorus compounds are removed. Bearing in mind the water content of 60%–70% wt of the used hydrogel, due to insitu the drying step, the silica hydrogel removed at least 300 mg/kg phosphorus substances/% wt based on dry silica hydrogel.

We claim:

1. Process for refining glyceride oil comprising the steps of:

i) contacting the glyceride oil with a silica hydrogel;

ii) removing water from the mixture of glyceride oil and silica hydrogel; and iii) separating the silica hydrogel from the mixture.

2. Process as claimed in claim 1, wherein the glyceride oil to be refined is a water degummed glyceride oil.

3. Process as claimed in claim 1, wherein prior to contacting the glyceride oil with the silica hydrogel, the glyceride oil is pretreated with an acid and/or water.

4. Process as claimed in claim 1, wherein the silica hydrogel has an initial water content of 30%–70% wt based on the silica hydrogel weight.

5. Process as claimed in claim 1, wherein the silica hydrogel is predried to a water content of less than 30% wt based on the silica hydrogel weight.

6. Process as claimed in claim 1, wherein the final water content of the mixture of glyceride oil and silica hydrogel is less than 0.2% wt, preferably 0.1% wt.

7. Process as claimed in claim 6, wherein the final water content is less than 0.1% wt.

8. Process as claimed in claim 1, wherein the amount of silica hydrogel added to the glyceride oil is 0.2%–5% wt, preferably 0.5%–2% wt based on the glyceride oil weight.

9. Process as claimed in claim 1, wherein the glyceride oil is further refined using bleaching earth.

10. Process as claimed in claim 9, wherein the silica hydrogel is removed from the mixture prior to the addition of bleaching earth.

11. Process as claimed in claim 9, wherein the bleaching earth is added to the mixture of glyceride oil and silica hydrogel.

* * * * *